(12) United States Patent
Spangler et al.

(10) Patent No.: US 10,494,939 B2
(45) Date of Patent: Dec. 3, 2019

(54) AIR SHREDDER INSERT

(71) Applicant: United Technologies Corporation, Farmington, CT (US)

(72) Inventors: Brandon W. Spangler, Vernon, CT (US); Atul Kohli, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 696 days.

(21) Appl. No.: 15/114,196

(22) PCT Filed: Jan. 28, 2015

(86) PCT No.: PCT/US2015/013161
§ 371 (c)(1),
(2) Date: Jul. 26, 2016

(87) PCT Pub. No.: WO2015/123017
PCT Pub. Date: Aug. 20, 2015

(65) Prior Publication Data
US 2017/0234151 A1     Aug. 17, 2017

Related U.S. Application Data

(60) Provisional application No. 61/939,302, filed on Feb. 13, 2014.

(51) Int. Cl.
*F01D 9/06* (2006.01)
*F01D 5/18* (2006.01)

(52) U.S. Cl.
CPC ............ *F01D 9/065* (2013.01); *F01D 5/188* (2013.01); *F01D 5/189* (2013.01); *F05D 2240/127* (2013.01); *F05D 2260/201* (2013.01); *F05D 2260/2212* (2013.01); *Y02T 50/676* (2013.01)

(58) Field of Classification Search
CPC ........... F01D 9/065; F01D 5/189; F01D 5/188
See application file for complete search history.

(56) References Cited

U.S. PATENT DOCUMENTS

| 2,993,337 A | * | 7/1961 | Cheeseman | F23R 3/06 60/757 |
|---|---|---|---|---|
| 3,574,481 A | | 4/1971 | Pyne, Jr. et al. | |
| 3,966,357 A | | 6/1976 | Corsmeier | |

(Continued)

FOREIGN PATENT DOCUMENTS

| EP | 1136651 A1 | 9/2001 |
|---|---|---|
| EP | 1284338 A2 | 2/2003 |

(Continued)

OTHER PUBLICATIONS

International Search Report and Written Opinion for International Application No. PCT/US2015/013161 dated May 8, 2015.

(Continued)

*Primary Examiner* — Eldon T Brockman
(74) *Attorney, Agent, or Firm* — Carlson, Gaskey & Olds, P.C.

(57) ABSTRACT

An engine component assembly includes at least one cavity that is in communication with a source of cooling air. An insert disposed within the cavity includes a plurality of scoops protruding into a flow of cooling air for directing cooling air through the insert and against an inner surface of the cavity.

18 Claims, 6 Drawing Sheets

(56) References Cited

U.S. PATENT DOCUMENTS

| | | | |
|---|---|---|---|
| 4,025,226 A | 5/1977 | Hovan | |
| 4,040,767 A | 8/1977 | Dierberger et al. | |
| 4,153,386 A | 5/1979 | Leogrande et al. | |
| 4,297,077 A | 10/1981 | Durgin et al. | |
| 4,542,867 A | 9/1985 | Memmen | |
| 4,616,976 A * | 10/1986 | Lings | F01D 5/186 415/114 |
| 4,773,593 A * | 9/1988 | Auxier | F01D 5/184 239/127.3 |
| 5,145,315 A | 9/1992 | North et al. | |
| 5,207,556 A | 5/1993 | Frederick et al. | |
| 5,253,976 A | 10/1993 | Cunha | |
| 5,383,766 A | 1/1995 | Przirembel et al. | |
| 5,419,039 A | 5/1995 | Auxier et al. | |
| 5,667,359 A | 9/1997 | Huber et al. | |
| 5,711,650 A | 1/1998 | Tibbott et al. | |
| 5,772,398 A | 6/1998 | Noiret et al. | |
| 5,816,777 A * | 10/1998 | Hall | F01D 5/189 416/97 R |
| 6,142,734 A | 11/2000 | Lee | |
| 6,193,465 B1 | 2/2001 | Liotta et al. | |
| 6,382,908 B1 | 5/2002 | Keith et al. | |
| 6,554,563 B2 * | 4/2003 | Noe | F01D 5/189 415/115 |
| 6,607,355 B2 | 8/2003 | Cunha et al. | |
| 6,769,875 B2 | 8/2004 | Tiemann | |
| 7,104,756 B2 | 9/2006 | Harding et al. | |
| 8,043,057 B1 | 10/2011 | Liang | |
| 8,393,867 B2 | 3/2013 | Chon et al. | |
| 8,480,366 B2 | 7/2013 | Malecki et al. | |
| 2003/0031555 A1 * | 2/2003 | Noe | F01D 5/189 415/115 |
| 2013/0280091 A1 | 10/2013 | Propheter-Hinckley et al. | |
| 2015/0226085 A1 * | 8/2015 | Spangler | F01D 25/12 60/806 |

FOREIGN PATENT DOCUMENTS

| | | |
|---|---|---|
| FR | 2149105 | 2/1973 |
| JP | 6-129204 | 5/1994 |

OTHER PUBLICATIONS

European Search Report for EP Application No. 15748506.1 dated Feb. 15, 2017.

International Preliminary Report on Patentability for International Application No. PCT/US2015/013161 dated Aug. 25, 2016.

* cited by examiner

AIR SHREDDER INSERT

REFERENCE TO RELATED APPLICATION

This application claims priority to U.S. Provisional Application No. 61/939,302 filed on Feb. 13, 2014.

BACKGROUND

This disclosure generally relates to an airfoil including an internal cooling chamber and baffle. More particularly, this disclosure relates to an airfoil including chambers for preferentially directing cooling air within the cooling chamber.

An airfoil utilized within a gas turbine engine includes a cooling chamber within which cooling air flows to remove heat from an inner surface of a wall exposed to extreme temperatures. A baffle within the cooling chamber includes a plurality of openings for directing air to impinge directly against the inner surface of the hot wall. The impingement of the cooling air against the hot wall improves cooling efficiencies.

Cooling efficiencies are further improved with heat transfer features formed on the surfaces of the cooling chamber. Some materials that include favorable temperature performance properties are not easily manufactured to include heat transfer features. Moreover, some materials may experience undesirable heat distributions with heat transfer features formed within a surface or structure exposed to high temperature gas flows.

Accordingly, it is desirable to design and develop features that improve cooling air efficiency and provide uniform cooling air temperatures along the airfoil.

SUMMARY

A turbine engine component according to an exemplary embodiment of this disclosure, among other possible things includes a component defining a cavity in communication with a source of cooling air, and an insert disposed within the cavity. The insert includes a plurality of scoops protruding into a flow of cooling air for directing cooling air through the insert and against an inner surface of the cavity.

In a further embodiment of any of the foregoing turbine engine components, the insert includes a baffle insert defining an interior channel with the plurality of scoops protruding into the interior space.

In a further embodiment of any of the foregoing turbine engine components, the baffle insert includes an open top through which the cooling air flows.

In a further embodiment of any of the foregoing turbine engine components, the insert includes a flat plate insert including a first side and a second side and the plurality of scoops extend from the flat plate insert on the first side.

In a further embodiment of any of the foregoing turbine engine components, plurality of scoops are configured to direct cooling air flow through the flat plate insert from the first side to the second side against the inner surface of the cavity.

In a further embodiment of any of the foregoing turbine engine components, the plurality of scoops are configured to generate turbulent cooling airflow on the first side of the flat plate insert.

In a further embodiment of any of the foregoing turbine engine components, the insert divides the cavity into separate channels comprising an interior channel for receiving cooling airflow and an exterior channel defined between the inner surface and the insert that receives cooling airflow through the plurality of scoops.

In a further embodiment of any of the foregoing turbine engine components, the plurality of scoops are arranged in rows across the insert and each of the rows is staggered relative to adjacent rows.

In a further embodiment of any of the foregoing turbine engine components, the plurality of scoops are configured to capture total pressure of the cooling air which is directed to impinge on the inner surface of the cavity.

In a further embodiment of any of the foregoing turbine engine components, the turbine engine component includes an airfoil including a plurality of film cooling openings for communicating cooling airflow from the cavity to an exterior surface of the airfoil.

In a further embodiment of any of the foregoing turbine engine components, the insert includes an integral portion of the component.

A turbine engine according to an exemplary embodiment of this disclosure, among other possible things includes a compressor section, a combustor section in fluid communication with the compressor section, a turbine section in fluid communication with the combustor section, an engine component with a cavity in communication with a source of cooling air, and an insert disposed within the cavity. The insert includes a plurality of scoops protruding into a flow of cooling air for directing cooling air through the insert and against an inner surface of the cavity.

In a further embodiment of any of the foregoing turbine engines, the engine component includes a portion of a stationary stage within the turbine section.

In a further embodiment of any of the foregoing turbine engines, the source of cooling air includes a portion of the compressor section.

In a further embodiment of any of the foregoing turbine engines, the insert includes a baffle insert defining an interior channel with the plurality of scoops protruding into the interior channel.

In a further embodiment of any of the foregoing turbine engines, the insert includes a flat plate insert including a first side and a second side and the plurality of scoops extend from the flat plate insert on the first side.

In a further embodiment of any of the foregoing turbine engines, the insert divides the cavity into separate channels including an interior channel for receiving cooling airflow and an exterior channel defined between the inner surface and the insert that receives cooling airflow through the plurality of scoops.

In a further embodiment of any of the foregoing turbine engines, the plurality of scoops is configured to capture total pressure of the cooling air which is directed to impinge on the inner surface of the cavity.

In a further embodiment of any of the foregoing turbine engines, the component includes an airfoil including a plurality of film cooling openings for communicating cooling airflow from the cavity to an exterior surface of the airfoil.

In a further embodiment of any of the foregoing turbine engines, the insert includes an integral portion of the component.

A method of cooling an engine component according to an exemplary embodiment of this disclosure, among other possible things includes inserting an insert into a cavity defined within an airfoil, the insert defines a plurality of scoops configured to direct cooling airflow through the insert and against in inner surface of the cavity, and supplying cooling airflow into the cavity and directing the cooling airflow with the plurality of scoops through the insert and against the inner surface of the cavity using total pressure to drive the flow through the plurality of scoops.

In a further embodiment of any of the foregoing methods, includes flowing cooling air through a plurality of film cooling holes defining passages between an outer surface of the engine component and the cavity at a pressure provided by the cooling flow directed from the plurality of scoops.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
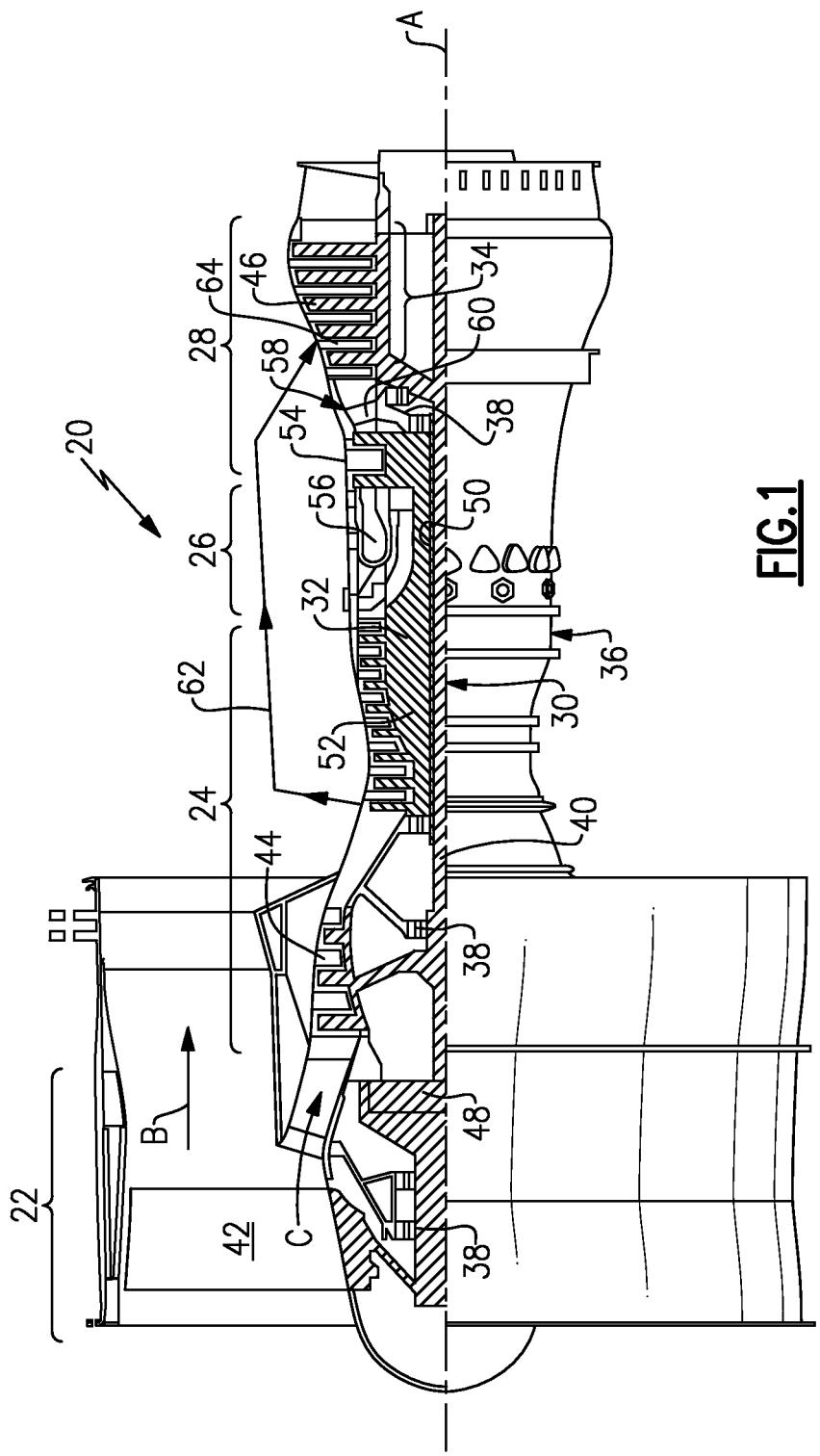
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10.67 km). The flight condition of 0.8 Mach and 35,000 ft (10.67 km), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7°R)]0.5. The "Low corrected fan tip speed" as disclosed herein according to one non-limiting embodiment is less than about 1150 ft/second (350 m/second).

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The turbine section 28 operates at elevated temperatures and therefore features for active cooling are provided. In this example cooling air from the compressor section 24 is communicated through a conduit 62 to the turbine section 28. In this example, cooling air is communicated to a stationary stage including vanes 64 that are part of the low pressure turbine 46. It should be understood, that although in this disclosed example cooling air is communicated to the fixed vane 64 of the low pressure turbine 46 that it is within the contemplation of this disclosure that cooling air may be supplied to other aircraft components, vane stages, blades and structures that are supplied with cooling airflow.

Figure 2:
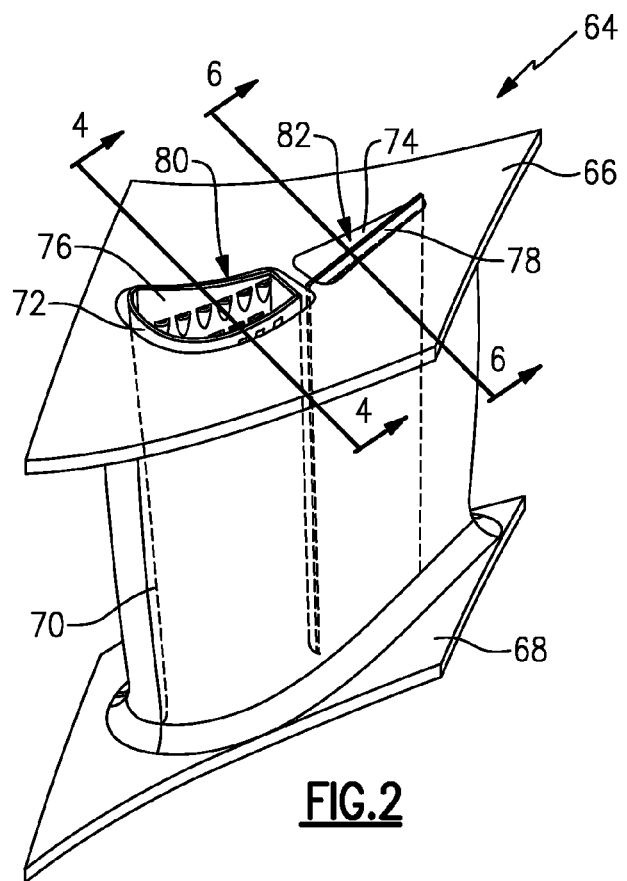
FIG. 2 is a perspective view of an example airfoil assembly including inserts for directing cooling airflow.

Referring to FIG. 2, an example turbine vane 64 includes an outer platform 66, an inner platform 68, and an airfoil that extends between the outer platform 66 and the inner platform 68. The airfoil section 70 is hollow and defines a first or leading edge cavity 72 and a second or trailing edge cavity 74. Cooling air is communicated through openings 80 and 82 into corresponding cavities 72 and 74.

The first cavity 72 includes a baffle 76 and the second cavity 74 includes a flat plate 78. Each of the baffle 76 and plate 78 are inserts that direct cooling airflow supplied to each of the corresponding cavities 72, 74. The inserts direct cooling air to impinge on outer walls of each of the corresponding cavities 72, 74.

Figure 3:
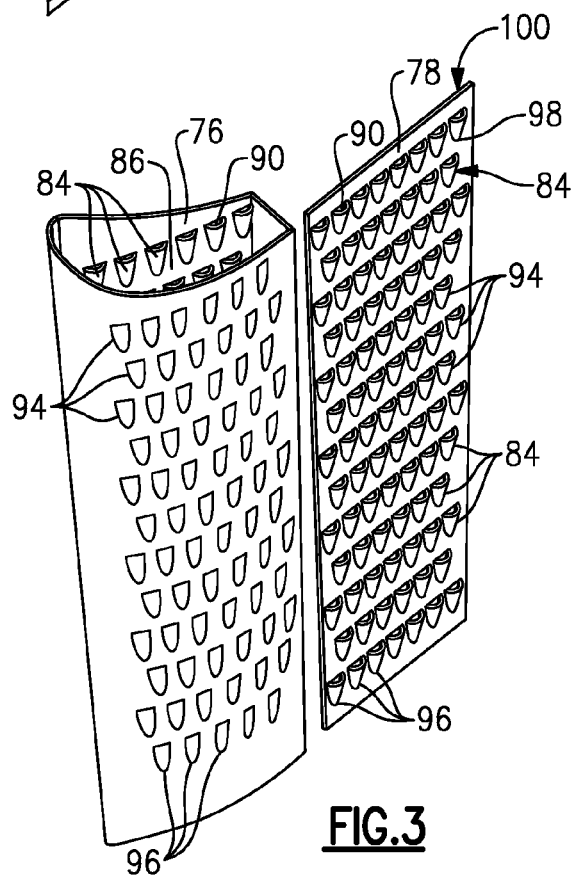
FIG. 3 is a perspective view of inserts for directing cooling airflow.

Referring to FIG. 3 with continued reference to FIG. 2, the baffle insert 76 defines an interior channel 86 and includes a plurality of scoops 84 that extend into that interior space. In the disclosed example, the scoops 84 are arranged in a plurality of rows 94 and columns 96 along the length of the baffle 76. The rows 94 and columns 96 of scoops 84 are staggered relative to an adjacent row and column. It is also within the contemplation of this disclosure that the scoops 84 could be distributed in other arrangements within either the baffle insert 76 or the flat plate 78.

The plate 78 includes a first side 98 and a second side 100. The plate also includes a plurality of scoops 84 that are arranged in rows 94 and columns 96. Each of the scoops 84 include an opening 90 directed towards the direction of incoming cooling air flow. The baffle 76 and the plate 78 are assembled into the corresponding cavity and secured in place to provide and direct cooling air flow that is supplied from the compressor section 24.

Figure 4:
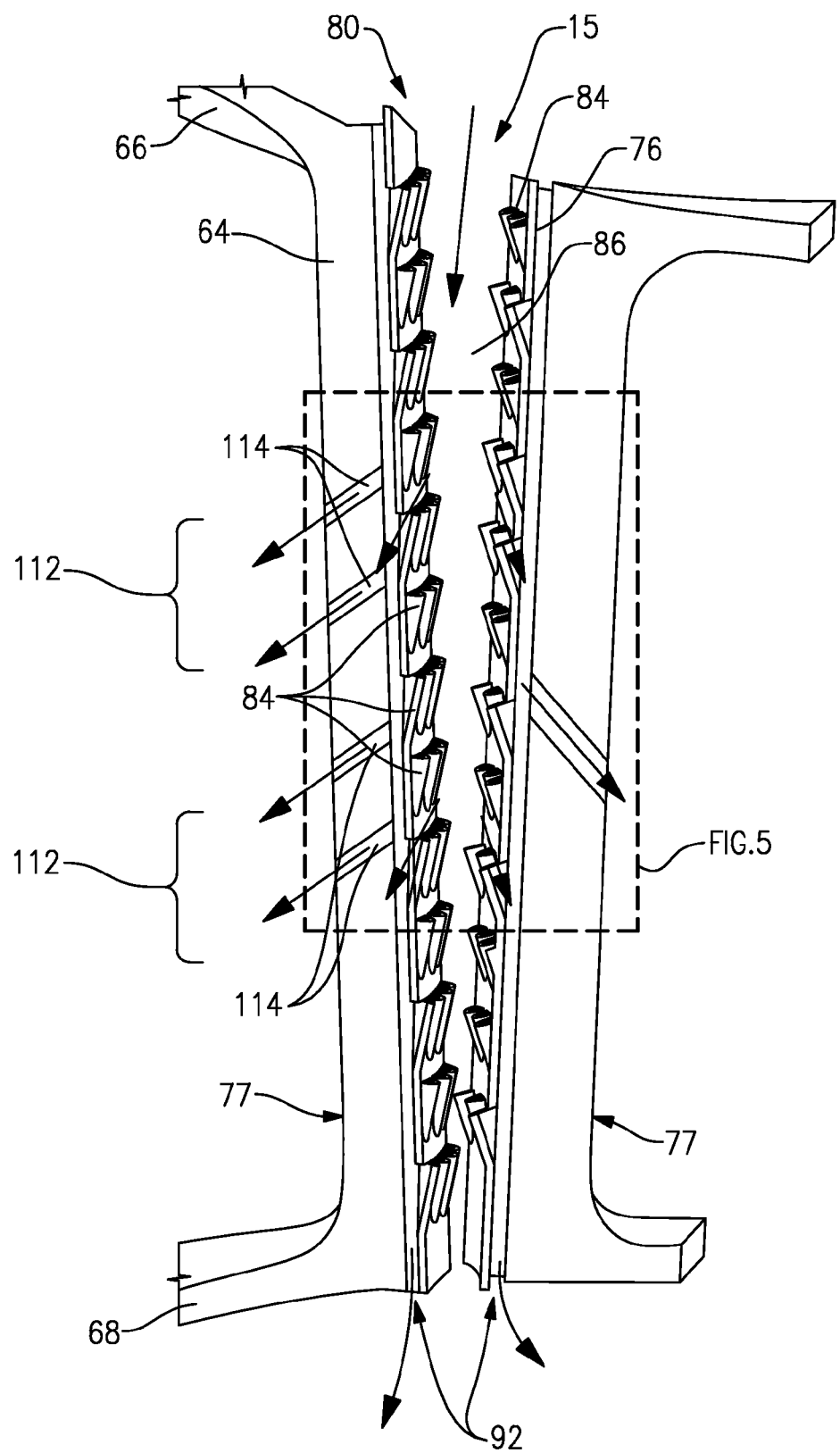
FIG. 4 is schematic view of cooling airflow through the baffle insert.
Figure 5:
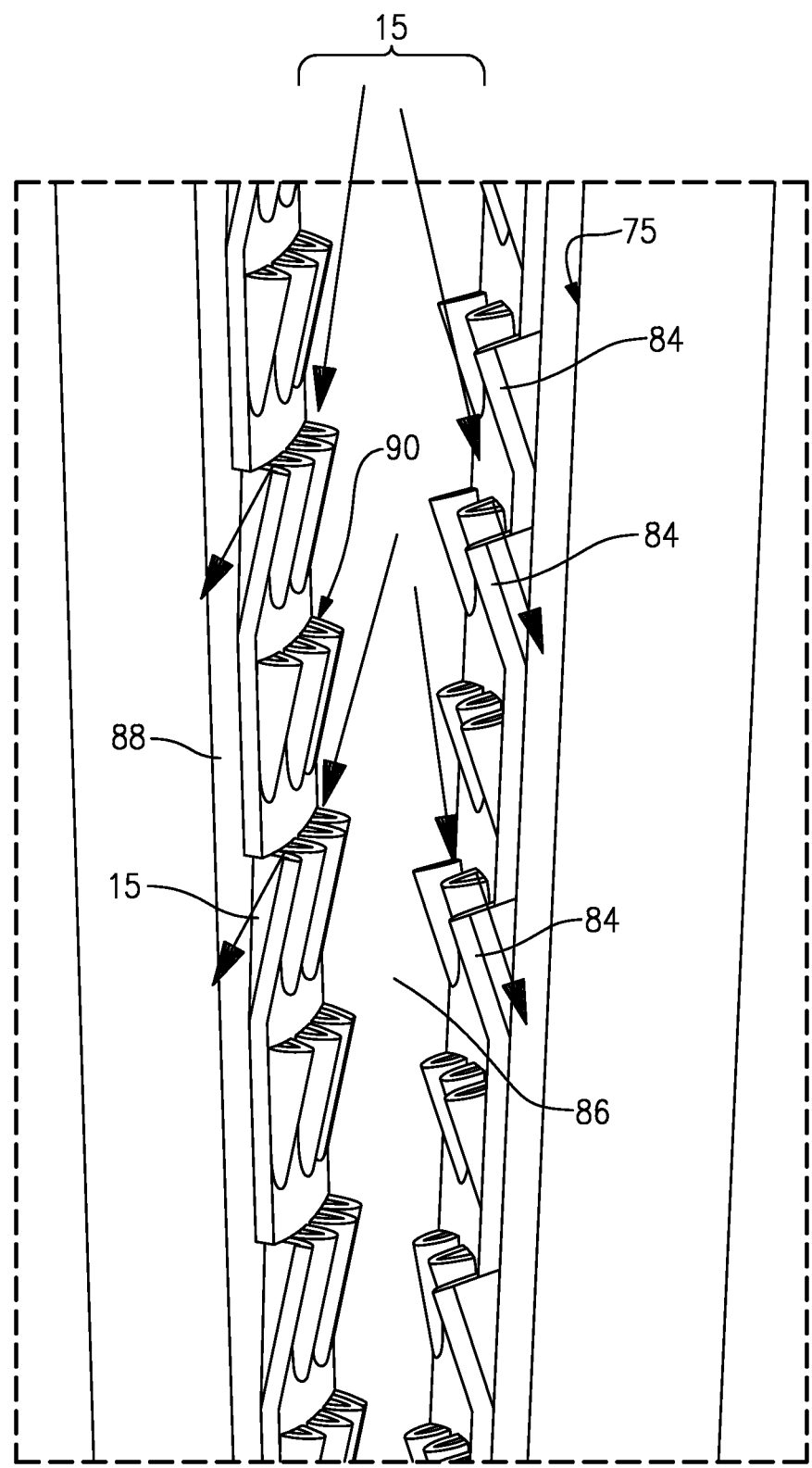
FIG. 5 is an enlarged schematic view of cooling airflow through the baffle insert.

Referring to FIGS. 4 and 5 with continued reference to FIG. 2, the leading edge cavity 72 is shown in cross-section including baffle 76. The baffle 76 is inserted into the leading edge cavity 72 such that it defines the interior channel 86 and an exterior channel 88 between the baffle 76 and the inner surface 75 of the cavity 72. Cooling air indicated by arrow 15 is supplied through the top opening 80 into the interior channel 86. Each of the plurality of scoops 84 includes the opening 90 that is directed upward to receive incoming air flow 15. The cooling air flow 15 is then directed through each of the plurality of scoops 84 and impinged against the inner surface 75 of the cavity 72. Cooling air flow 15 is then exhausted through film cooling holes 114 or through bottom openings 92 of channel 88 defined between the baffle 76 and inner surface 75 of cavity 72.

Since opening 90 is aimed at incoming air flow 15, the scoops 84 utilize total pressure, rather than static pressure, to drive the cooling flow 15 against inner surface 75 of cavity 72. This increases the pressure delta across the baffle 76, which increases impingement heat transfer on inner surface 75 of cavity 72.

Figure 6:
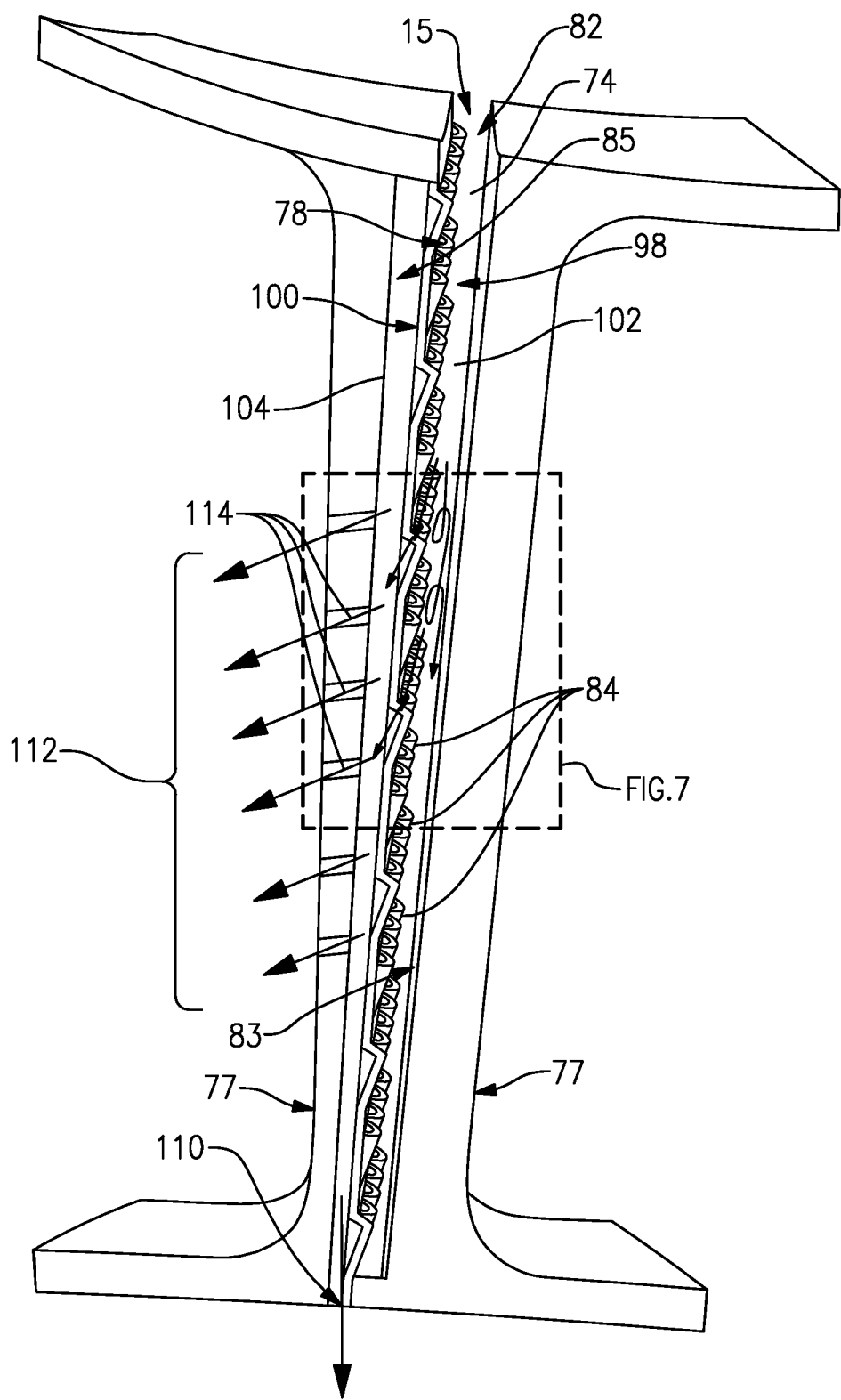
FIG. 6 is a schematic view of cooling airflow through the flat plate insert.
Figure 7:
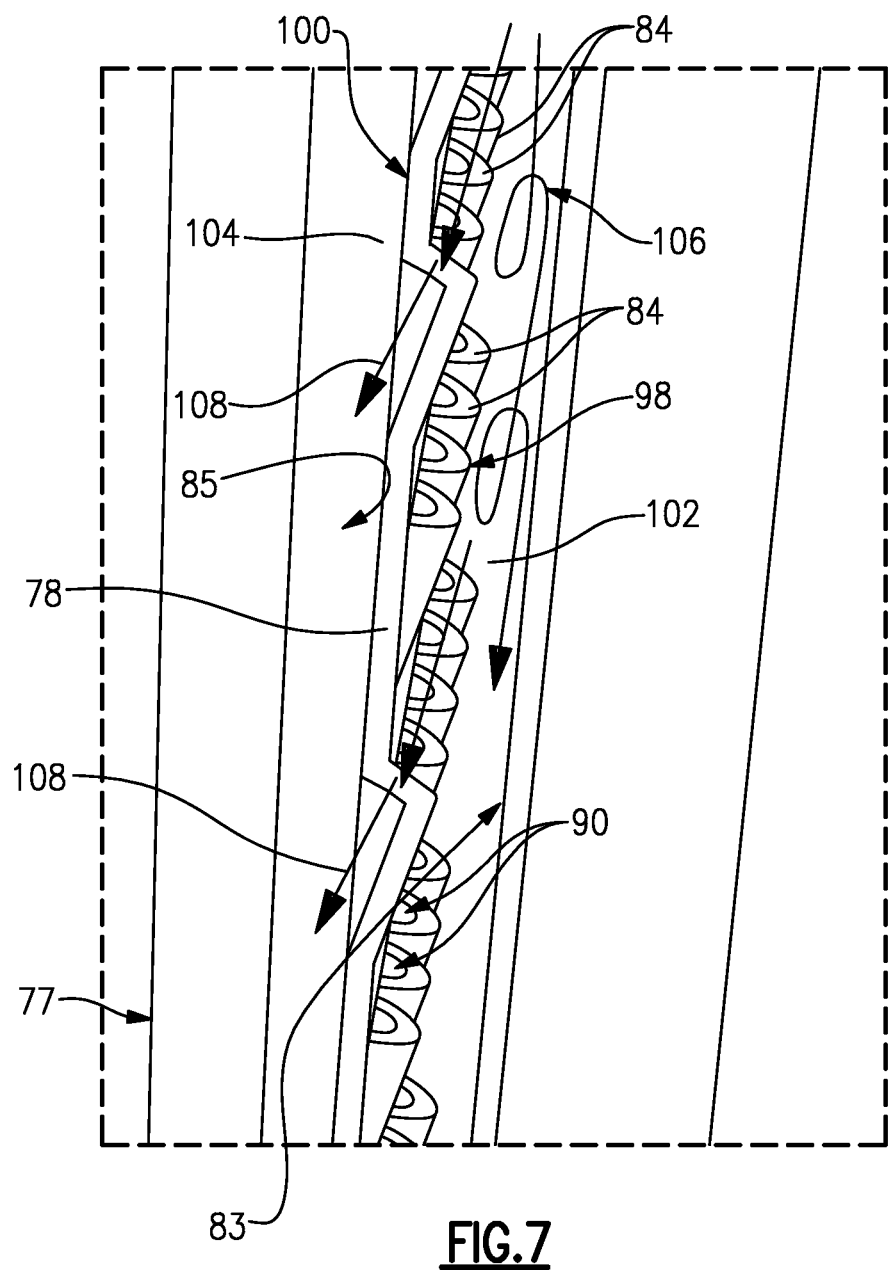
FIG. 7 is an enlarged schematic view of cooing airflow through the flat plate insert.

Referring to FIGS. 6 and 7 with continued reference to FIG. 2, the trailing edge cavity 74 is smaller and therefore includes the flat plate insert 78. The flat plate insert 78 includes a plurality of the scoops 84 that extend from a first side 98. Cooling air 15 directed into the cavity 74 is directed through the scoops 84 from the first side 98 to a second side 100.

The flat plate insert 78 divides the cavity 74 into a first part 102 and a second part 104. In this example, the parts 102 and 104 extend the radial length of the cavity 74. Each of the scoops 84 includes the opening 90 directed upward to receive incoming cooling airflow 15 and direct that airflow 15 through the flat plate 78 from the first side 98 to the second side 100. Cooling air flow directed through the plate 78 is impinged on an inner surface 85 of the cavity 74 within the second part 104, using total pressure as the driving pressure. Air flow that remains within the first part 102 is disturbed to create a turbulent air flow that scrubs against the inner surface 83 of cavity 74 to generate improved heat transfer performance. The combination of impingement cooling airflow in the second part 104 and turbulent flow in the first part 102 provide improved heat transfer performance.

Referring to FIGS. 3, 4 and 6, a plurality of film cooling holes 114 extend through the airfoil 70 between each of the cavities 72, 74 to the outer surface 77. Cooling air flows from each cavity 72, 74 to the outer surface 77 of the airfoil 70 to provide film cooling airflow 112. The film cooling airflow 112 provides additional cooling along the outer surface of the turbine vane 64. Because the scoops 84 utilize total pressure rather than static pressure to direct cooling airflow, the pressure in channels 88 and 104 is also higher. This results in pressure across the film cooling holes 114 being increased without increasing supply pressure. The increased pressure of film cooling airflow 112 reduces the possibility of back flow through the film cooling holes 114 of hot exhaust gases. Cooling air flow that is not communicated through the film cooling holes 114 is directed through a bottom surface or opening 110 and will either be exhausted or supplied to other features for cooling purposes.

Accordingly, cooling of the disclosed turbine vane 64 is providing by inserting the baffle 76 and the flat plate 78 into a corresponding one of the cavities 72, 74 within the airfoil 70. The baffle 76 and plate 78 include the plurality of scoops 84 configured to direct cooling airflow 15 against the inner surface 75, 85 of the corresponding cavity 72, 74 using total pressure as the driving pressure. Cooling airflow is then directed through the plurality of film cooling holes 114 that define passages between the outer surface 77 of the airfoil 70 and the corresponding cavity 72, 74.

The example scoops 84 defined within the baffle 76 and the flat plate 78 are stamped features arranged in columns 96 and rows 94 spaced apart such that they provide total desired cooling air flow against the inner surfaces 75, 85 of each cavity 72,74. In certain turbine vane applications, the vanes are fabricated from material that is not favorable of the creation of integrally formed flow directing features. Accordingly, the example inserts 76, 78 both direct cooling airflow for impingement and generate turbulence to improve heat transfer performance.

It should be understood that while a turbine vane airfoil was used to describe an example embodiment, the concepts can also apply to airfoils, vanes, blades, BOAS, combustor liners, platforms, and other cooled components in the engine. Further, even though the baffle inserts 76, 78 were depicted as separate pieces that are typically formed from sheet metal, they may be integral to the component 64 and formed using additive manufacturing or advanced casting techniques.

Although a preferred embodiment of this invention has been disclosed, a worker of ordinary skill in this art would recognize that certain modifications would come within the scope of this disclosure. For that reason, the following claims should be studied to determine the true scope and content of this disclosure.

What is claimed is:

1. A turbine engine component comprising:
   a turbine vane defining a leading edge cavity and a trailing edge cavity that are each in communication with a source of cooling air; and
   a baffle insert received within the leading edge cavity, the baffle insert defining an interior channel and a plurality of scoops protruding inward from walls on at least two sides of the interior channel into a flow of cooling air for directing cooling air through the baffle insert and against an inner surface of the cavity; and
   a plate insert received within the trailing edge cavity and dividing the trailing edge cavity into a first part and a second part, wherein the plate insert includes a plurality of scoops protruding outward into a flow of cooling air for directing airflow through the plate insert from the first part into the second part and for generating a turbulent flow of air.

2. The turbine engine component as recited in claim 1, wherein the baffle insert includes an open top through which the cooling air flows.

3. The turbine engine component as recited in claim 1, wherein the plate insert includes a first side and a second side and the plurality of scoops extend from the plate insert on the first side.

4. The turbine engine component as recited in claim 3, wherein the plurality of scoops are configured to direct cooling air flow through the plate insert from the first side to the second side against the inner surface of the trailing edge cavity.

5. The turbine engine component as recited in claim 3, wherein the plurality of scoops are configured to generate turbulent cooling airflow on the first side of the plate insert.

6. The turbine engine component as recited in claim 1, wherein the baffle insert divides the leading edge cavity into separate channels comprising an interior channel for receiving cooling airflow and an exterior channel defined between the inner surface and the baffle insert that receives cooling airflow through the plurality of scoops.

7. The turbine engine component as recited in claim 1, wherein the plurality of scoops are arranged in rows across the baffle insert and each of the rows is staggered relative to adjacent rows.

8. The turbine engine component as recited in claim 1, wherein the plurality of scoops of the baffle insert and the plate insert are configured to capture total pressure of the cooling air which is directed to impinge on the inner surface of the corresponding one of the leading edge cavity and the trailing edge cavity.

9. The turbine engine component as recited in claim 1, wherein the turbine vane includes a plurality of film cooling openings for communicating cooling airflow from the leading edge cavity to an exterior surface of the airfoil.

10. A turbine engine comprising:
    a compressor section;
    a combustor section in fluid communication with the compressor section;
    a turbine section in fluid communication with the combustor section;
    an engine airfoil component with a leading edge cavity and a trailing edge cavity both in communication with a source of cooling air;
    a baffle insert received within the leading edge cavity, wherein the baffle insert includes a plurality of scoops protruding into a flow of cooling air for directing cooling air through the baffle insert and against an inner surface of the leading edge cavity; and
    a plate insert received within the trailing edge cavity, wherein the plate insert includes a first side and a second side and the plurality of scoops extend from the plate insert on the first side and the plate insert divides the trailing edge cavity into a first part bounded on one side by the first side with the plurality of scoops and an internal surface of the trailing edge cavity and a second part bounded on one side by the second side of the flat plate insert the internal surface of the trailing edge cavity.

11. The turbine engine as recited in claim 10, wherein the engine airfoil component comprises a portion of a stationary stage within the turbine section.

12. The turbine engine as recited in claim 10, wherein the source of cooling air comprises a portion of the compressor section.

13. The turbine engine as recited in claim 10, wherein the baffle insert defines an interior channel with the plurality of scoops protruding into the interior channel.

14. The turbine engine as recited in claim 10, wherein the baffle insert divides the cavity into separate channels comprising an interior channel for receiving cooling airflow and an exterior channel defined between the inner surface and the baffle insert that receives cooling airflow through the plurality of scoops.

15. The turbine engine as recited in claim 14, wherein the plurality of scoops is configured to capture total pressure of the cooling air which is directed to impinge on the inner surface of a corresponding one of the leading edge cavity and the trailing edge cavity.

16. The turbine engine as recited in claim 10, wherein the airfoil component includes a plurality of film cooling openings for communicating cooling airflow from the cavity to an exterior surface of the airfoil.

17. A method of cooling an engine component comprising:
    inserting a baffle insert into a leading edge cavity defined within an airfoil, wherein the baffle insert defines a plurality of scoops configured to direct cooling airflow through the baffle insert and against in inner surface of the leading edge cavity;

inserting a plate insert into a trailing edge cavity within the airfoil, wherein the plate insert divides the trailing edge cavity into a first part bounded on one side by the first side with the plurality of scoops and an internal surface of the trailing edge cavity and a second part bounded on one side by the second side of the flat plate insert the internal surface of the trailing edge cavity;

supplying cooling airflow into the leading edge cavity and directing the cooling airflow with the plurality of scoops through the baffle insert and against the inner surface of the leading edge cavity using total pressure to drive the flow through the plurality of scoops; and supplying cooling airflow into the trailing edge cavity and directing a portion of the cooling airflow with the plurality of scoops through the plate insert against an inner surface of the trailing edge cavity and generating a turbulent flow with the plurality of scoops in another portion of cooling airflow against the inner surface within the first part of the trailing edge cavity.

18. The method as recited in claim 17, including flowing cooling air through a plurality of film cooling holes defining passages between an outer surface of the engine component and the cavity at a pressure provided by the cooling flow directed from the plurality of scoops.

* * * * *